T. A. COLEMAN.
VEHICLE BRAKE.
APPLICATION FILED MAR. 21, 1910.
997,273.
Patented July 11, 1911.
2 SHEETS—SHEET 1.
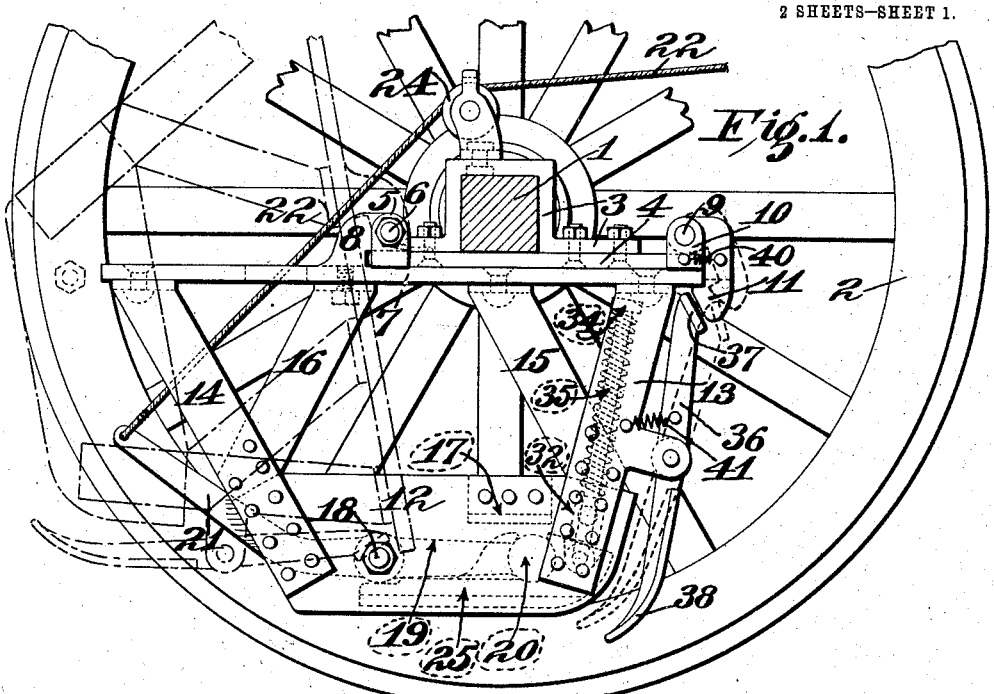
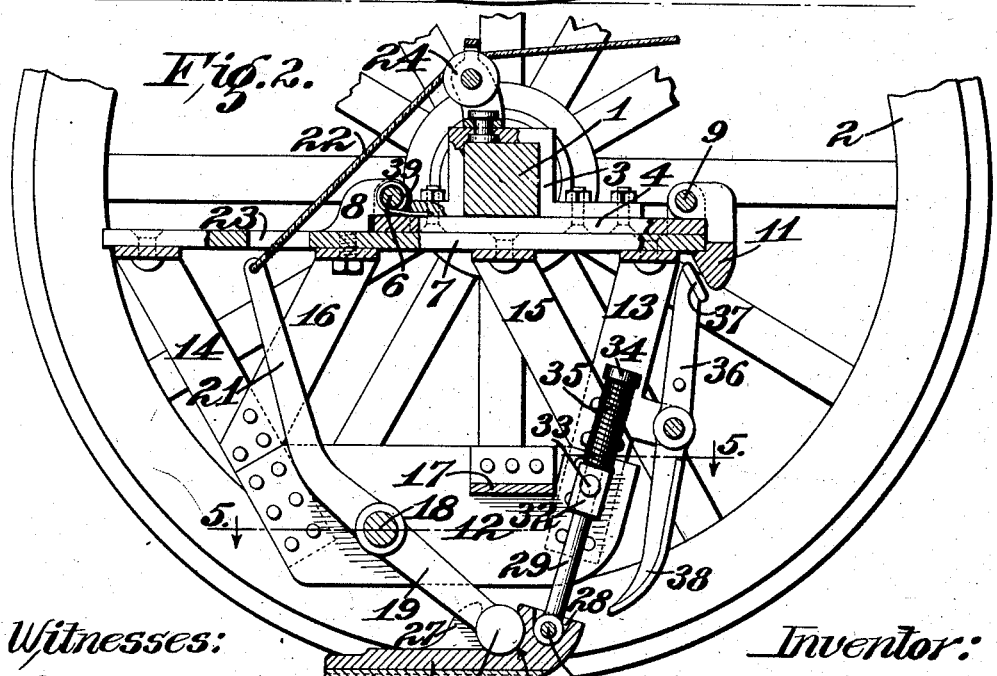

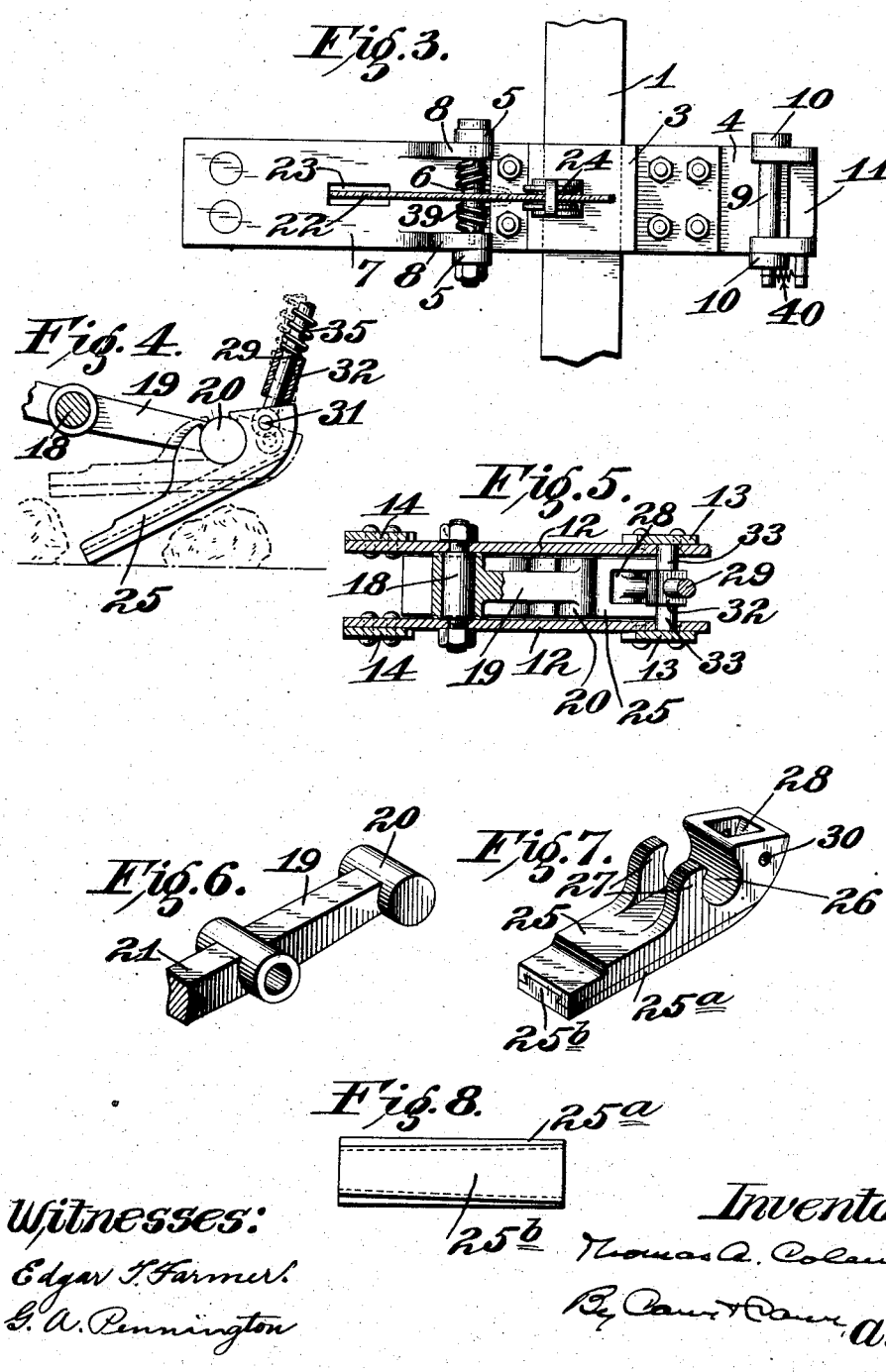

UNITED STATES PATENT OFFICE.

THOMAS A. COLEMAN, OF ST. LOUIS, MISSOURI.

VEHICLE-BRAKE.

997,273. Specification of Letters Patent. Patented July 11, 1911.

Application filed March 21, 1910. Serial No. 550,598.

*To all whom it may concern:*

Be it known that I, THOMAS A. COLEMAN, a citizen of the United States, and a resident of the city of St. Louis and State of Missouri, have invented a certain new and useful Improvement in Vehicle-Brakes, of which the following is a specification.

This invention relates to vehicle brakes and more particularly to ground brakes, or brakes whose shoes are brought in contact with the ground or surface over which the vehicle is passing, to check the speed and to bring the vehicle to a stop. Objections to brakes of this character arise from the liability of accidental damage to the parts which are carried adjacent to the ground in such a position that they usually strike large stones or other projections lying in the path thereof; and, also, from the lack of flexibility in certain parts of the mechanism.

The principal objects of the present invention are to secure a simple structure which is light and yet sufficiently rigid to withstand the stresses incidental to its use, to avoid accidental damage to the device, and to attain certain other advantages hereinafter more fully appearing.

In the accompanying drawings which form part of this specification, and wherein like symbols refer to like parts wherever they occur, Figure 1 is a transverse section through an axle showing a brake mounted thereon according to my invention, with a portion of the wheel broken away; Fig. 2 is a view similar to Fig. 1, showing the brake mechanism partly in section and the brake shoe in contact with the ground; Fig. 3 is a fragmentary top plan view showing the axle and a portion of the brake mechanism; Fig. 4 is a fragmentary view showing the initial position of the brake shoe as it is brought in contact with the ground; Fig. 5 is a section on the line 5—5 of Fig. 2; Fig. 6 is a fragmentary perspective view of the actuating lever for the brake shoe; Fig. 7 is a perspective view of the brake shoe; and Fig. 8 is a plan view of a detachable wear plate for the brake shoe.

As shown in the drawings, the brake mechanism is mounted on an axle 1 on the end of which is a wheel 2. Preferably, the device is mounted midway between the ends of the axle; and in some cases, for example, where platform spring arrangements are provided for the running gear, as in the case of a fire truck, the device is preferably mounted on the front axle.

Supported on the axle 1 is a strap or yoke 3 which is bolted or otherwise securely fastened at its opposite ends to a plate 4. This plate 4 extends transversely of the axle underneath the same and has upturned lugs 5 on its rear end which are perforated in axial alinement to receive a transverse pivot bolt 6. A plate 7 is provided on its upper face with lugs 8 whose end portions are hooked or turned forwardly substantially parallel with the face of the plate. The lugs are perforated so as to pivotally fit upon the bolt 6 which is mounted on the lugs 5 of the plate 4. The rear end portion of the plate 7 extends some distance beyond the plate 4 and its front end terminates substantially square or flush with the front end of said plate 4.

Pivotally mounted on a cross pin 9 which is carried by lugs or ears 10 on the front end portion of the plate 4 is a hook member 11 which is arranged and adapted to engage the front end portion of the plate 7 to hold the same normally in contact with said plate 4 as shown in Figs. 1 and 2.

Depending from the pivotally mounted plate 7 is a frame comprising two parallel side plates 12 which are secured to the lower end portions of front and rear supporting members 13, 14, respectively. These frame members 13, 14 each comprise, preferably, one continuous strip which is bent into substantially U-shape and riveted at its middle portion to the underside of the plate 7. Suitable stiffening braces 15, 16 are secured to the plate 7 and to the frame members 13, 14, substantially as shown; and these braces 15, 16 are preferably formed of a continuous strip like said members 13, 14. The side plates 12 are connected by a cross tie member or brace 17 which is preferably a plate whose opposite end portions are bent at right angles and riveted to the respective side plates 12. This brace 17 is preferably located near the front and upper edge portions of the side plates 12 while the rear portions of said side plates are preferably connected by a cylindrical cross member or stud 18 whose opposite end portions are reduced in diameter and projected through alining perforations in the side plates. The reduced end portions of the stud 18 are screw-threaded to receive clamping nuts which are tightened against the outer faces of the plates 12.

Pivotally mounted on the stud 18 is a rocking lever 19 whose forward end portion is provided with a cylindrical T-head 20. The rear end portion 21 of the rocking lever is bent upwardly and has secured thereto the end of a cable or other flexible cord 22 which passes up through a slot 23 in the plate 7, thence over a pulley 24 which is swiveled on the top of the strap 3, and thence to any suitable operating lever or other obvious manipulating device, not shown.

Pivotally mounted on the cylindrical T-head 20 of the rocking lever 19 is a brake shoe 25. This brake shoe is provided with a transverse cylindrical seat or pocket 26 which is a counterpart of the T-head 20 and is open at its top. The upper portion of the shoe at the rear of the seat 26 is slotted longitudinally to receive the forward portion of the lever 19 and to provide a transverse pair of retaining lugs 27. The open portion at the top of the cylindrical seat 26 is of a width less than the diameter of the T-head 20 and a little more than the width of the lever 19. By this arrangement, the head 20 may be moved into the seat 26 transversely of the shoe, the end portion of the lever 19 passing through the opening at the top of the seat 26 until the longitudinal slot is reached, whereupon the lever is dropped into said slot and the parts are held against lateral displacement by the lugs 27.

In the top of the front end portion of the brake shoe 25 is formed a pocket 28 having a rounded bottom and upwardly flaring front and rear walls. In this pocket is pivotally fitted the lower end portion of the rod 29. The lower end portion of this rod 29 is provided with an eye or transverse perforation in line with alining holes 30 in the shoe which are adapted to receive the pivot pin 31. The rod 29 is slidably fitted through a bore in a swivel block 32 having trunnions 33 which are journaled in perforations in the side plates 12. A head 34 is provided on the upper end of the rod 29; and a spring 35 is coiled loosely about the upper portion of said rod 29, between the head 34 and the upper end of the swivel block 32, whereby said rod is resiliently held in normally raised position. By this arrangement, the brake shoe and operating lever are also resiliently held in raised position and restored to such position by the spring 35.

Pivotally mounted at the front of the frame is a trigger or tripping device 36 whose upper end portion 37 is arranged and adapted to bear against the hook 11 and whose lower portion 38 is located in front of the side plates 12 and brake shoe 25; and it is preferably curved rearwardly substantially as shown.

In practice, the lower edges of the side plates 12 are located a short distance above the ground and just far enough to clear slight obstacles; and the end 38 of the lever 36 extends a little lower than the bottom edges of the plates 12. By this arrangement, should a stone or other obstruction of proportions to damage the under-frame, lie in the path of the same, it will be first struck by the lower portion of the trigger 36 whereupon the same is rocked and its upper portion bears against the hook 11 and forces the same from under the end of the plate 7, whereupon the entire under-frame will swing rearwardly on the pivot bolt 6 which is carried by the lugs 5 on the fixed plate 4. As soon as the obstruction is passed, the under-frame may be swung into normal position; and to give force to the return movement of the frame, a rebent spring 39 has its middle portion secured between the rear end of the strap 3 and the plate 4 and its opposite end portions coiled loosely around the stud or bolt 6 and secured to the respective lugs 8 on the plate 7 of the under-frame. By this arrangement, the spring 39 is wound tighter as the frame swings rearwardly in passing over an obstruction, and it reacts to forcibly swing the frame back to normal position, whereupon the hook 11 will engage the front end of the plate 7. A spring 40 is provided to yieldingly hold the hook 11 in its normal position and a spring 42 is likewise provided for the tripping lever 36.

When it is desired to apply the brake, the cord or cable 22 is pulled and the lever 19 is rocked on its pivot stud 18. As shown in Fig. 4, the rear end of the brake shoe 25 will first be brought in contact with the ground as the forward end of the lever 19 starts to move downward, the pivotal connection between the shoe 25 and the resiliently supported rod 29 which is mounted in the swivel block 32, permitting this action of the parts. As soon as the rear portion of the brake shoe comes in contact with the ground, the continued downward movement of the forward portion of the lever 19 will move the shoe flatwise upon the ground against the tension of the spring as shown in Fig. 2. It will thus be seen that the brake shoe is gradually brought into flatwise position. Owing to this pivotal and yielding arrangement of the parts whereby the rear end of the shoe drops first, it is noted that if a small rock or other projection happens to lie under the brake shoe as the same is being moved into contact with the ground, the shoe will ride over the obstruction without damaging the mechanism. That is, as soon as the shoe strikes the rock or other surface projection, the shoe in riding thereover will pivot on the T-head 20 of the lever 19, as shown by the broken lines on Fig. 4, the spring 35 and pivotal connections between the brake shoe and the rod 29 permitting of such movement.

The brake shoe 25 preferably is provided with a detachable wear plate 25ᵃ having a dovetail rib 25ᵇ adapted to fit in a counterpart groove in the bottom of the shoe. The rib 25ᵇ and its counterpart groove are preferably tapered as shown in Fig. 8, or any other suitable arrangement for securing the wear plate to the shoe may be employed.

Obviously, my device admits of considerable modification without departing from my invention. Therefore, I do not wish to be limited to the specific construction and arrangement shown.

What I claim is:

1. A vehicle brake comprising a depending frame which is pivotally mounted and adapted to swing free of the ground, a shoe mounted on said frame and adapted to be moved into contact with the ground, mechanical means for operating said shoe, a releasable device for rigidly holding the frame in normal position, and a tripping device arranged and adapted to release said holding device so that the frame is free to swing out of the way of an obstruction lying on the ground in the path thereof.

2. A vehicle brake comprising a depending frame which is pivotally mounted and adapted to swing free of the ground, a shoe mounted on said frame and adapted to be moved into contact with the ground, mechanical means for operating said shoe, a releasable device for rigidly holding said frame in normal position, and a tripping device mounted in front of said frame and adapted to strike an obstruction lying on the ground in the path thereof and thereby release said holding device so that the frame is free to swing out of the way of the obstruction.

3. In a vehicle brake, the combination with an axle, of a plate secured to the underside of said axle, a plate pivotally connected to the rear end of said fixed plate, a hook pivotally mounted on the front end of said fixed plate and arranged and adapted to engage said pivotal plate and hold the same normally in contact with said fixed plate, a frame depending from said pivotal plate, a shoe mounted on said frame and adapted to be moved into contact with the ground, and a tripping device mounted in front of said frame and adapted to release said hook from said pivotal plate whereby the same is free to swing on its pivot.

4. A vehicle brake comprising a pivotally mounted depending frame, a shoe mounted on said frame and adapted to be moved into contact with the ground, a releasable device for holding said frame in normal position, a tripping device mounted in front of said frame and adapted to release said holding device from said frame whereby the same is free to swing on its pivot, and a spring arranged to restore said frame to normal position.

5. In a vehicle brake, the combination with an axle, of a plate secured to the underside thereof, a plate pivotally connected to the rear end of said fixed plate, a hook pivotally mounted on the front end of said fixed plate and adapted to engage the front end of said pivotal plate and hold the same in contact with said fixed plate, a depending frame mounted on said pivotal plate, a brake shoe mounted in said depending frame and adapted to be moved into contact with the ground, a tripping device pivotally mounted in front of said frame and adapted to engage said hook to release the same from said pivotal plate, whereby the frame is free to swing on its pivot, and a spring arranged to be energized when said frame swings away from said hook and adapted by its reaction to restore said frame to normal position.

6. A vehicle brake comprising a depending frame, a rocking lever mounted in said frame, a brake shoe pivotally mounted on said rocking lever, a rod slidably mounted in a swivel block in said frame and pivotally connected at one end to said brake shoe, and a spring coiled around said rod between a fixed stop on its end opposite to its pivot and said swivel block.

7. A vehicle brake comprising a depending frame, a rocking lever mounted in said frame, a brake shoe pivotally mounted on said rocking lever and held normally in horizontal position, a substantially vertical rod pivotally mounted at its lower end to said brake shoe and slidably fitted in a swivel block which is journaled on said frame, and a spring coiled around said rod between a fixed stop on its upper end and said swivel block.

8. In a vehicle brake, the combination with an axle, of a depending frame secured thereon, a rocking lever mounted in said frame, a brake shoe pivotally mounted near its front end on said rocking lever and adapted to be moved into contact with the ground, a substantially vertical rod pivotally connected at its lower end to the front portion of said brake shoe and slidably fitted in a swivel block which is journaled in said frame, a spring coiled around said rod between a fixed stop on the upper end thereof and said swivel block, whereby said brake shoe and connected parts are resiliently held in normal position, and whereby, also, the rear end of said brake shoe is first moved into contact with the ground when said rocking lever is actuated to set the brake.

9. In a vehicle brake, the combination with a depending frame, of a rocking lever pivoted transversely on said frame, a brake shoe pivotally connected intermediate its ends to the forward end of said rocking lever, a substantially vertical rod slidably and pivotally mounted on said frame and pivoted at its lower end to the forward end portion of said brake shoe, and resilient means for holding said rod normally in raised position.

10. In a vehicle brake, the combination with a depending frame, of a rocking lever mounted on said frame, said rocking lever having a cylindrical T-head at one end, a brake shoe having a transverse counterpart seat for said T-head and a longitudinal slot opening into said seat and adapted to receive said rocking lever, a substantially vertical rod slidably fitted through a swivel block on said frame and having its lower end pivoted to the end portion of said brake shoe, a fixed stop on the upper end of said rod, and a coiled spring slidably mounted on said rod between said fixed stop and the top of said swivel block.

11. In a vehicle brake, the combination with a depending supporting frame comprising two parallel side plates, of a rocking lever mounted between said side plates, said rocking-lever having a cylindrical T-head on its end, and a brake shoe having a counterpart transverse seat for said T-head and also having a longitudinal slot opening into said counter part seat adapted to receive the end portion of said rocking lever.

In testimony whereof I have signed my name to this specification in the presence of two subscribing witnesses this 16th day of March, 1910.

THOMAS A. COLEMAN.

Witnesses:
G. A. PENNINGTON,
J. B. MEGOWN.

Copies of this patent may be obtained for five cents each, by addressing the "Commissioner of Patents, Washington, D. C."